United States Patent [19]

Parker et al.

[11] 4,308,239
[45] Dec. 29, 1981

[54] OBTAINING COPPER (I) CHLORIDE FROM ORES WITH ACETONITRILE

[75] Inventors: Alan J. Parker, South Perth; David M. Muir, Palmyra; Eric J. Grimsey, Burrendah, all of Australia; John S. Preston, Redding, England

[73] Assignee: Anumin Pty. Ltd., Murdoch, Australia

[21] Appl. No.: 35,051

[22] Filed: May 1, 1979

[30] Foreign Application Priority Data

May 1, 1978 [AU] Australia .............................. PD4242

[51] Int. Cl.$^3$ ............................................... C01G 3/05
[52] U.S. Cl. ....................................... 423/24; 423/34; 423/38; 423/42; 423/493; 804/107
[58] Field of Search ........................ 423/34, 35, 42, 43, 423/493, 491, 24, 38; 203/14, 20, 57, 58, 59, 60

[56] References Cited

U.S. PATENT DOCUMENTS

| | | |
|---|---|---|
| 3,865,744 | 2/1975 | Parker et al. |
| 3,937,657 | 2/1976 | Parker et al. |
| 3,961,028 | 6/1976 | Parker et al. |
| 3,966,890 | 6/1976 | Parker et al. |
| 4,070,183 | 1/1978 | Parker et al. |
| 4,113,848 | 9/1978 | Parker et al. |

OTHER PUBLICATIONS

Sigal et al., "Increasing the Solubility of Copper Monochloride in Chloride Solutions By SomeOrganic Additions", *Ivestiva Vysshikh Uchebuykh Zavedenii Khim i Khim Tekh.*, vol. 18(9), (1975), pp. 1357-1359.
Recovery of Copper, Iron, and Sulfur from Chalcopyrite Concentrate Using a Ferric Chloride Leach, Haver et al., Feb. 1971 – Journal of Metals – pp. 25-29.
Hydrometallurgy for Copper Concentrates?– Dasher et al. – Oct. 2-3, 1972 – pp 1-15 w/footnotes.

*Primary Examiner*—Brian E. Hearn
*Attorney, Agent, or Firm*—Fleit & Jacobson

[57] ABSTRACT

Cuprous (Copper (I)) chloride is an intermediate for the production of copper metal concentrates. A method of purifying copper salts and particularly cuprous chloride is disclosed which involves utilizing the solubility of cuprous chloride and other copper salts in a mixture of water and acetonitrile of 2-hydroxycyanoethane or acrylonitrile and the ability of cuprous chloride to precipitate when the organic component of the mixture is distilled off. The electrolysis of cuprous chloride in water containing at least 10 grams per litre of copper (I), acid and between 5% and 50% by volume of a water soluble organic nitrile such as acetonitrile or 2-hydroxycyanoethane is also disclosed.

4 Claims, 5 Drawing Figures

Fig. 1. SOLUBILITY OF CuCl (as Cu⁺) IN ACETONITRILE/WATER MIXTURES, ACIDIFIED TO pH 1-2 WITH HCl AT AMBIENT TEMPERATURE.

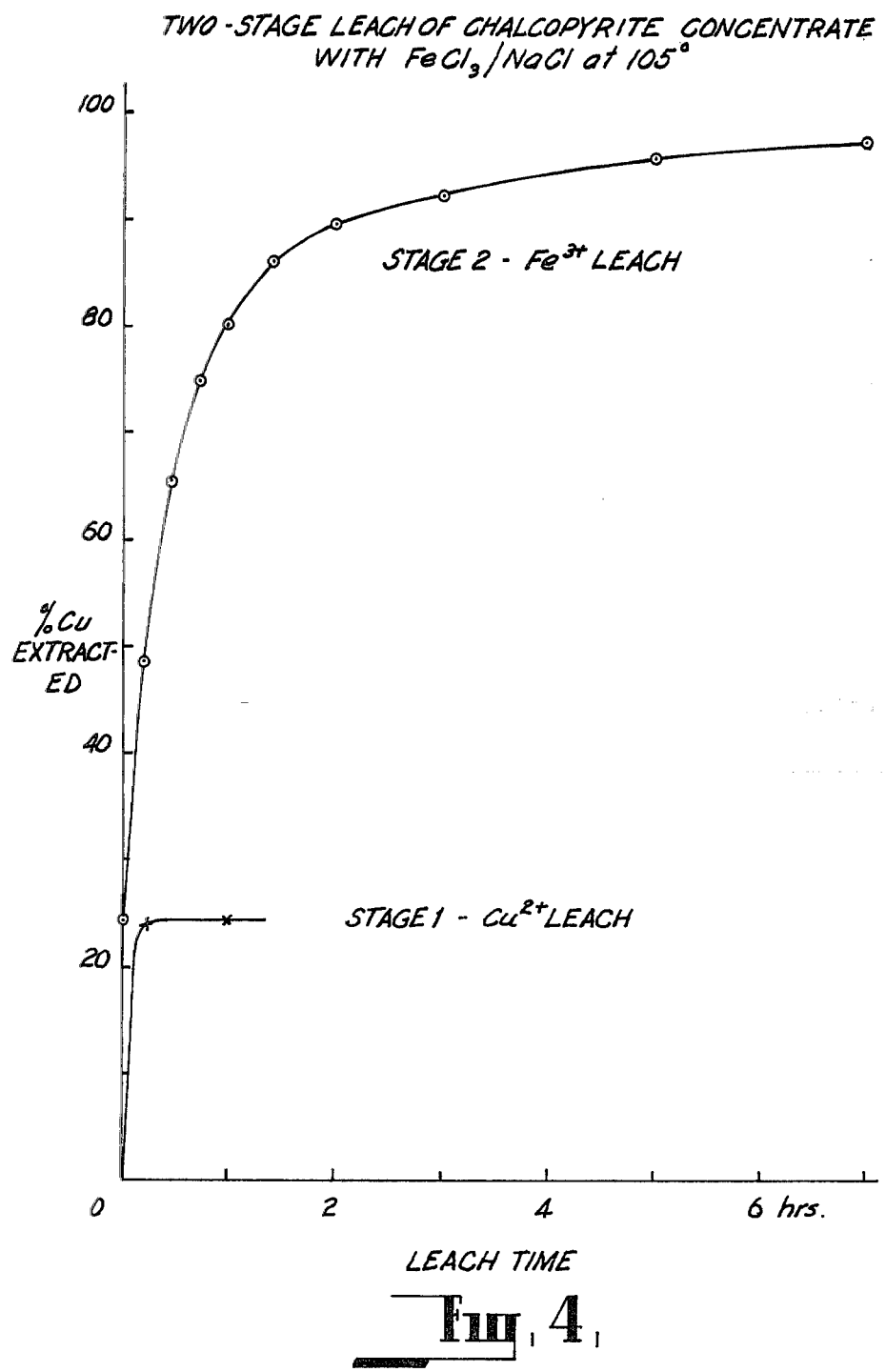

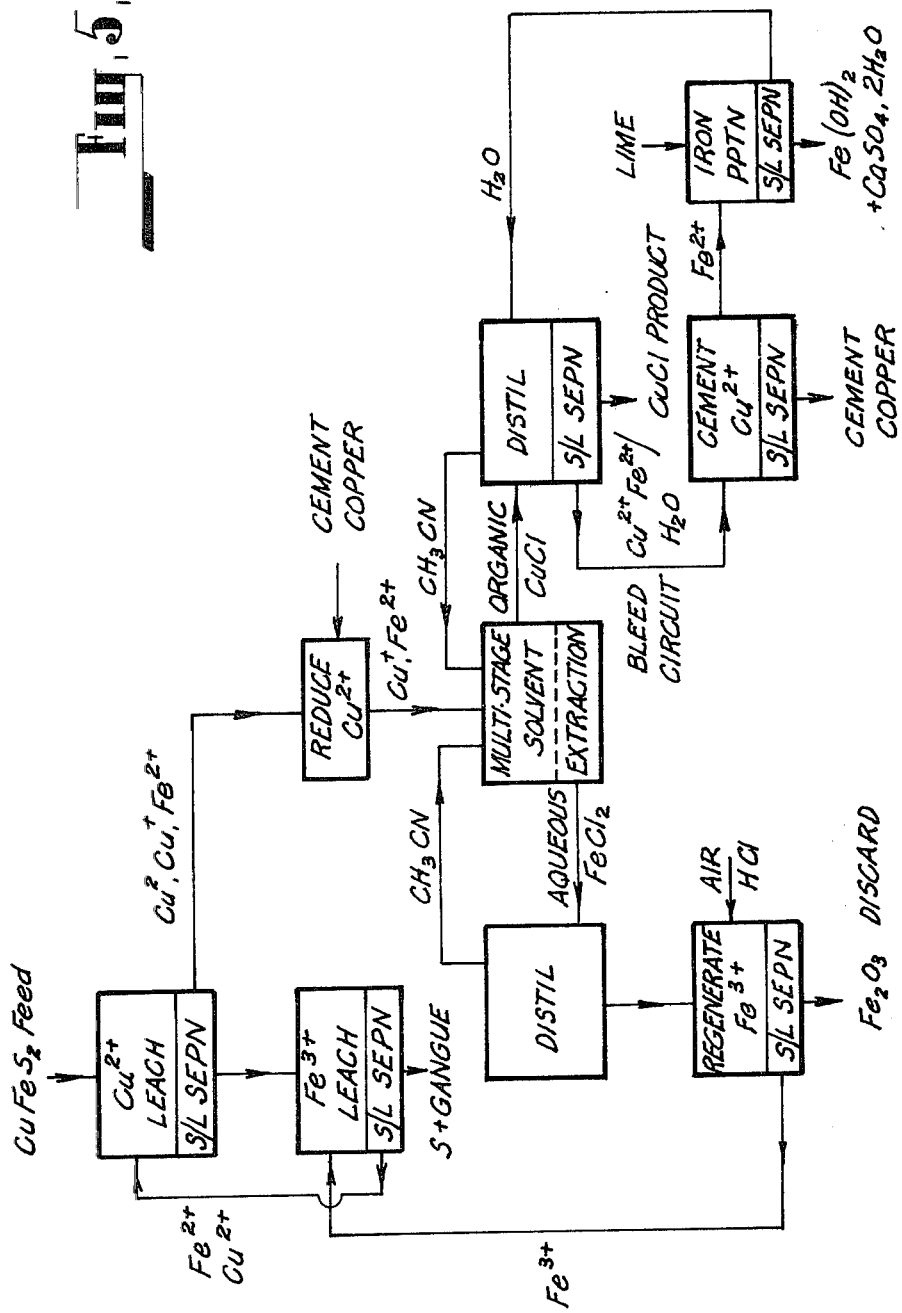

OBTAINING COPPER (I) CHLORIDE FROM ORES WITH ACETONITRILE

This invention relates to a method of purifying copper salts and in particular copper (I) chloride. It also relates to a method of obtaining copper (I) chloride from solutions of copper (I) chloride and a method of preparing solutions of copper (I) chloride suitable for recovery of copper by electrolysis. The methods allow solutions of low chloride ion activity containing practical concentrations of cuprous ions to be use for the processing of copper. The invention also relates to a new composition of matter containing copper (I) chloride.

Copper (I) chloride is an intermediate for production of copper metal from concentrates. As such, it has become increasingly important following the observation that ferric chloride solutions leach chalcopyrite and cupric chloride solutions leach chalcocite, to give sulphur and solutions containing cuprous chloride (F. P. Haver and M. M. Wong J. Metals, 23, 25 (1971)). The well known Cymet and Duval processes (J. Dasher—Paper to the 2nd Hydrometallurgy Group Meeting—Canadian Institute of Mining and Metallurgy, Oct. 2, 1972) involve the generation of copper (I) chloride solutions by leaching $CuFeS_2$ with ferric chloride. Copper can be obtained from anhydrous copper (I) chloride by gas phase reduction of copper (I) chloride with hydrogen. This is understood to be the method used in the Cymet process. Copper can also be electrowon from copper (I) chloride solutions. Clearly the purer the copper (I) chloride, the purer the copper product, especially if hydrogen reduction is followed. Currently there is much research interest in winning copper from solutions of copper (I) chloride by electrolysis. This is because of the relatively low energy requirements. In many of the investigations, the "copper (I) chloride solutions" are actually solutions of polychloride complexes of copper (I) ions, such as $CuCl_2^-$. Copper (I) chloride has low solubility in water (0.24 g/l at 25° C.), so for leaching and electrolysis, solutions which have a high activity of chloride ions, such as brine, have been used to achieve practical concentrations of copper (I) in solution.

Corrosion problems are enhanced the greater the chloride ion activity in solution. Another difficulty is the problem of recovering copper (I) chloride from concentrated chloride solutions. This can be achieved with difficulty by lowering the chloride ion activity, or by cooling the solutions as in the Cymet process.

Pure Copper (I) chloride is a highly desirable material for reduction to copper, either with hydrogen or by electrolysis and for preparation of copper chemicals such as copper (I) oxide or of copper oxychloride.

The invention is based on the discovery that the solubility of copper (I) chloride in water is greatly enhanced by the presence of water-soluble organic nitriles such as acetonitrile, 2-hydroxycyanoethane or cyrylonitrile and that in the case of solutions containing acetonitrile, copper (I) chloride is precipitated as acetonitrile is distilled from aqueous solutions of copper (I) chloride containing acetonitrile.

Thus in one form the invention resides in a new composition of matter comprising a solution at least 10 g/liter of copper (I) chloride in a mixture of water, with between 5% and 80% by volume acetonitrile or 2-hydroxycyanoethane or acrylonitrile.

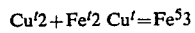

$$Cu'2 + Fe'2 \; Cu' = Fe^53$$

FIG. 4 depicts the percent copper extracted by a two stage ferric chloride leach of chalcopyrite.

FIG. 5 is a flow diagram of an overall chalcopyrite leach process.

Figure 1:
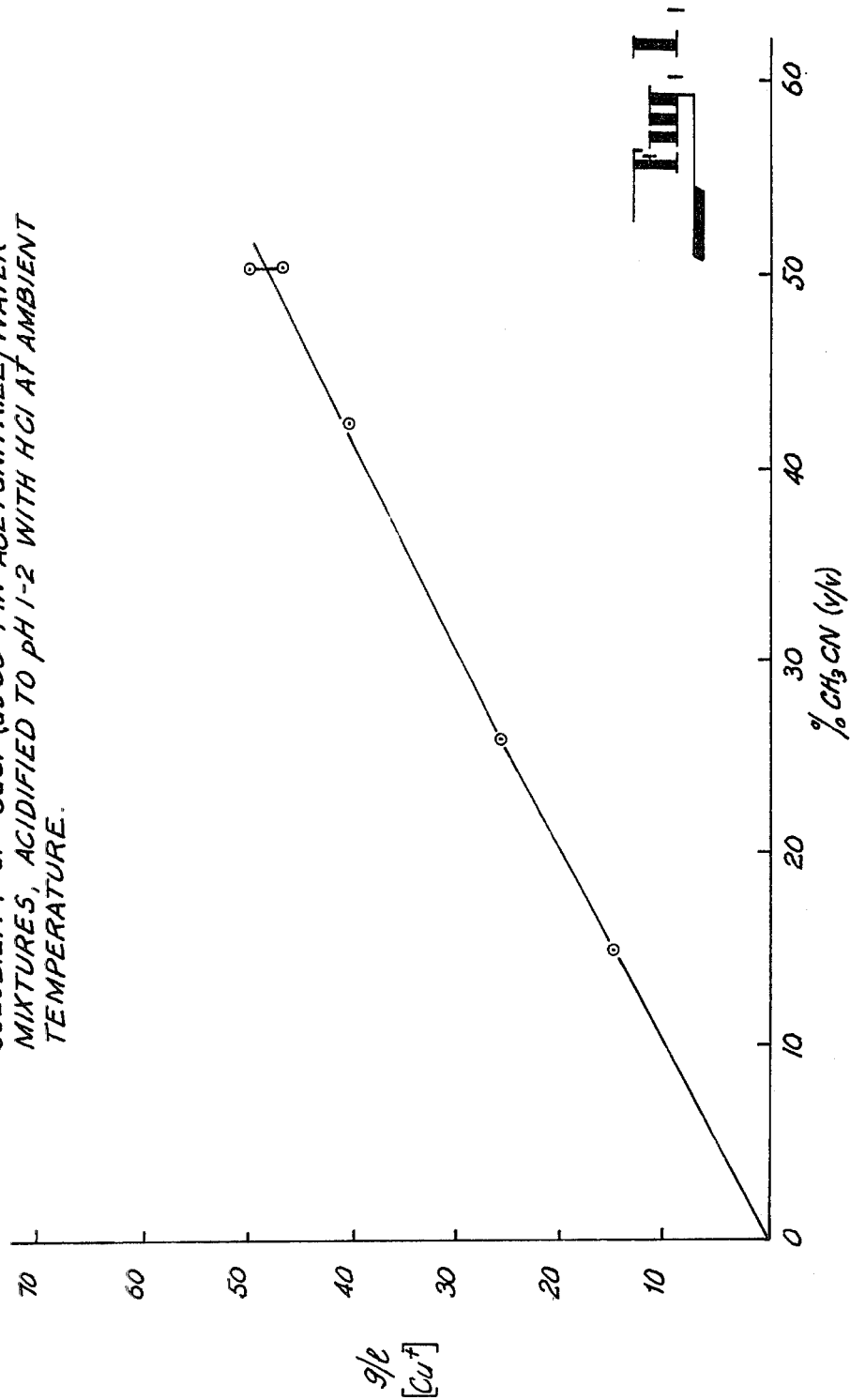
FIG. 1 is a graphical representation of copper (I) chloride solubility in acetonitrile-water mixtures.

The solubility of copper (I) chloride in water containing various proportions of acetonitrile at pH 1–2 at 25° C. was measured and is shown in FIG. 1 of the accompanying drawings. Copper (I) chloride solutions containing up to 50 g/liter copper (I) were prepared when 50% v/v acetonitrile was present. The solubility is greater at higher temperatures. The solutions preferably were prepared in the absence of oxygen, since oxygen slowly oxidises copper (I) to copper (II). Samples of copper (I) chloride or various purities were used to prepare solutions. When acetonitrile was distilled at 80°–100° C. from filtered solutions of copper (I) chlorides in water containing other soluble chlorides, copper (I) chloride was precipitated as a white solid, at a pH above 3, some copper (I) oxide was precipitated also. The yields and purity of the precipitated copper (I) chloride after cooling solutions to 20° C. filtering and washing with cold water are shown in the table. Naturally the yield of CuCl was decreased in solutions of increased chloride ion activity, but even in solutions containing 10 g/l excess Cl⁻ as $NiCl_2$, the solubility of Cucl was only 1 g/l at 20° in water.

TABLE 1

| Purification of Copper (I) Chloride and Recovery from Solution at 20° C. | | | | | | | | |
|---|---|---|---|---|---|---|---|---|
| Solution 30% v/v $CH_3CN^c$ grams/liter | | | | | CuCl Product$^a$ ppm | | | % Recovery$^a$ of CuCl |
| Cu | Ni | Co | Fe | Cl | Ni | Co | Fe | |
| 19 | — | — | — | — | <50 | <50 | <25 | 95 |
| 18 | 9.4 | 0.16 | 0.05 | 5$^e$ | 500 | <20 | <50 | 92 |
| 24 | 1 | 0.1 | — | 0.05$^e$ | <20 | <25 | <50 | 95 |
| 18 | — | — | — | 25$^d$ | — | — | — | 84 |

$^a$After distillation of acetonitrile from the appropriate solution and cooling solutions to 20° C., filtering and washing with 200 ml of cold water, the CuCl contained the elements shown.
$^b$Analysis by atomic absorption, less than means not detectable.
$^c$Solutions were at pH 1–2 acidified with HCl.
$^d$As NaCl.
$^e$As $NiCl_2$.
$^f$Solution was prepared by dissolving CuCl in water containing 35% by volume 2-hydroxycyanoethane at pH 1.5.

In one form, the invention resides in a method of purifying copper (I) chloride, suitable for conversion to copper, whereby copper (I) chloride is dissolved in water containing acetonitrile, the solution is separated from any insoluble material and acetonitrile is then removed from the solution, preferably by distillation, such as to precipitate copper (I) chloride, which is then separated from the liquid phase, containing any soluble impurities. Preferably the amount of acetonitrile is between 5 and 60% by volume.

In another form, the invention is a method of obtaining copper (I) chloride, suitable for conversion to copper, from solutions of copper (I) chlorides in water containing at least 5% by volume acetonitrile whereby acetonitrile is removed from the solution, preferably by distillation, such as to precipitate copper (I) chloride, which is then separated from the liquid phase.

In another form, the invention is a method of preparing solutions of copper (I) chlorides suitable for recovery of copper by electrolysis, whereby copper (I) chloride is dissolved in water containing acid and between 5 and 50% by volume of a water soluble organic nitrile, taken from the group acetonitrile and 2-hydroxycyanoethane, the proportions of organic nitriles, copper (I) species and acid, preferably hydrochloric, as described herein being such as to give a homogenous solution of pH less than 3 containing at least 5 gm per liter copper (I).

In yet another form, the invention provides a method of electrolysing solutions of copper (I) chlorides, whereby homogenous solutions of copper (I) chlorides in water containing at least 10 grams per liter copper (I), acid and between 5 and 50% by volume of a water soluble organic nitrile, taken from the group acetonitrile and 2-hydroxycyanoethane, are electrolysed between an inert anode and a cathode.

ELECTROLYSIS OF COPPER (I) CHLORIDE

A solution containing 30 grams per liter copper (I) as copper (I) chloride was prepared by dissolving copper (I) chloride in water containing 30% by volume 2-hydroxycyanoethane and 0.5 moles/liter hydrogen chlorides at 40° C. The solution (250 ml) was electrolysed for one hour between a graphite anode and a copper cathode (1" separation) at a potential of 0.92–1.02 volts and a current density of 10 amps/sq. foot. A little glue (100 ppm) was added to improve the copper deposit but the copper deposit was rough and porous with some needle-like crystals. At higher current densities a non adherent powder was formed. The current efficiency was 93%. Copper (II) chloride was produced at the anode. A closely related experiment was formed with acetonitrile replacing the 2-hydroxycyanoethane with similar results.

Whilst the invention has been described with particular reference to the treatment of copper (I) chloride it is equally applicable to the treatment of other copper (I) salts such as copper (I) sulphite which are relatively insoluble in water but are soluble in water containing acetonitrile. This aspect of the invention is illustrated in the following example:

5 gms of copper (I) sulphite was dissolved in 100 ml of a solution containing 30 ml acetonitrile and 70 ml water at pH 3.5. Distillation of the acetonitrile precipitated 4 gm of copper (I) sulphite.

Thus in another form the invention resides in a method of obtaining copper (I) salts in a substantially pure form which comprises dissolving impure copper (I) salt in water containing at least 5% by volume acetonitrile and then separating the insoluble components, removing the acetonitrile from the solution, preferably by distillation, such as to precipitate the copper (I) salts, which is then separated from the liquid phase containing any soluble impurities.

This aspect of the invention will be better understood by reference to the following specific experiment:

EXPERIMENTAL

The chalcopyrite used in the investigation was a Mount Isa Mines Limited flotation concentrate which contained 25.3% copper, 26.4% iron and 32.1% sulphur, as well as 9.8% silica, 0.4% zinc, 0.3% lead, 0.02% arsenic, 0.07% bismuth and 0.02% silver. This assay is equivalent to 75% chal copyrite and 10% pyrite in a silicate gangue. Acetonitrile was freed from unsaturated organics by distillation over potassium permanganate prior to its use. All other nitriles were laboratory grade products and were used as received.

Leaching tests were carried out in a 1 liter Erlenmeyer flask fitted with a magnetic stirrer and reflux condenser. Stoichiometric quantities of the concentrate (92 g of —200 mesh material) and leach liquor (500 ml) were employed, corresponding to a 18.5% pulp density. Solvent extraction experiments were conducted in hand-shaken 250 ml separating funnels which were flushed with nitrogen to minimise oxidation of copper (I) chloride. Total copper and iron were determined by atomic absorption spectrophotometry. Copper (II) was determined by iodometric titration against standard thiosulphate and copper (I) by titration against standard permanganate. Chloride was estimated by potentiometric titration against standard silver nitrate solution. Acetonitrile phase compositions were determined by density measurements using an Anton-Parr DMA 02D precision density meter, after correction for dissolved salts.

RESULTS AND DISCUSSION

Extraction of Copper (I) chloride into Organic Nitriles and TBP

Copper (I) chloride is only very slightly soluble in water but is quite soluble in homogeneous acetonitrile-water mixtures as well as in aqueous solutions of high chloride ion activity. It achieves maximum solubility (ca. 1.6 M) in the composition of acetonitrile-water (ca. 85% w/w $CH_3CN$) which is "salted out" as an organic phase when at least 1 M salts (other than copper (I) are present in the aqueous phase at 25°. This composition is close to the azeotropic $CH_3CN/H_2O$ composition, and will be referred to as "Azeotropic acetonitrile" throughout this paper.

Figure 2:
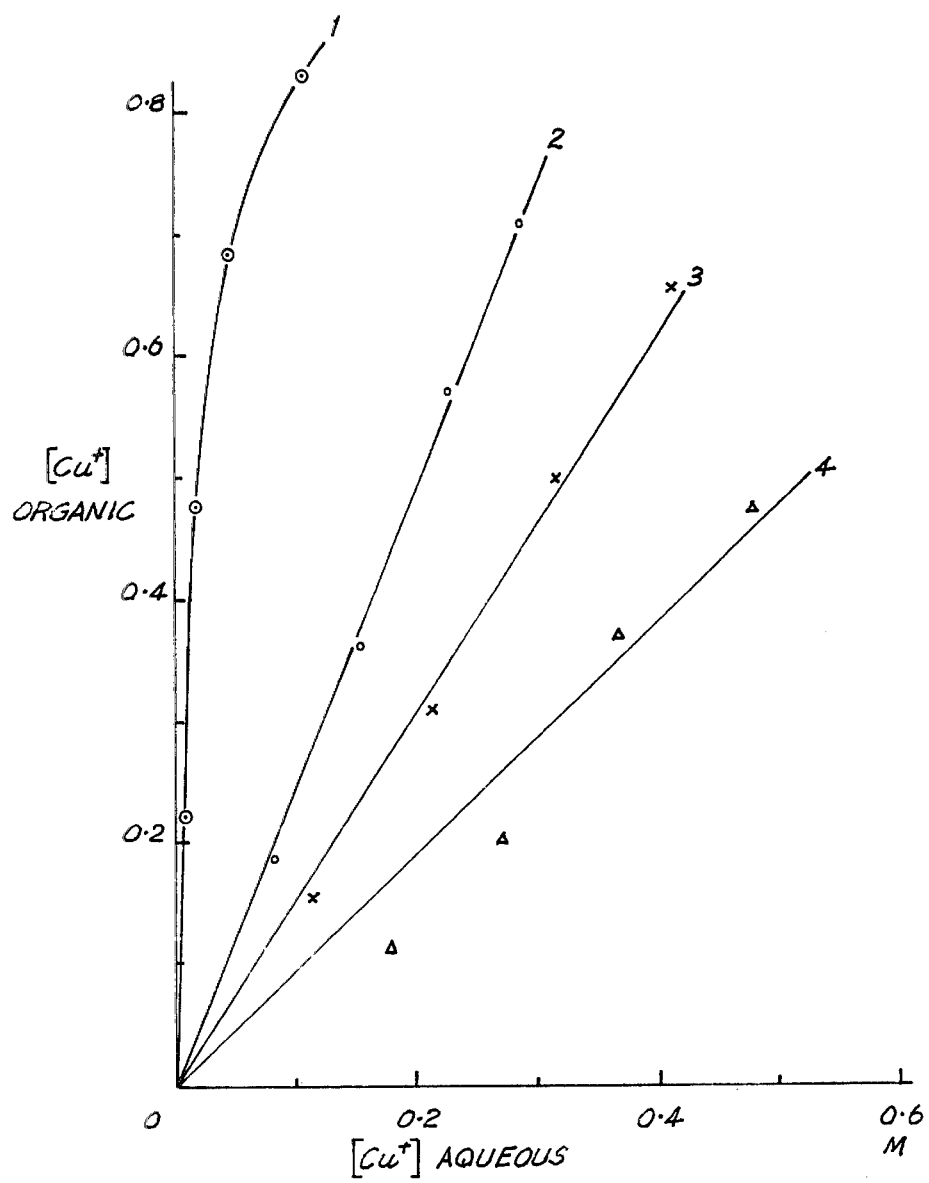
FIG. 2 is a graphical representation of the extraction isotherms of copper (I) chloride into several nitrides and TBP

The extraction of copper (I) chloride from 3.5 M $CaCl_2$ into several organic nitriles and into TBP is compared in FIG. 2. The concentration of chloride ion in the aqueous phase is typical of that present in chloride leach liquors. The TBP extracts copper (I) as an ion pair of the $CuCl_2^-$ complex, as it does other complex metal chlorides. The distribution coefficient of copper (I) between TBP and 3.5 M $CaCl_2$ varies between 10 and 50, according to the concentration of copper (I). The extraction of copper (I) as $Cu(RCN)_3Cl$ into organic nitriles is not as efficient as extraction by TBP. Distribution coefficients vary with the identity of the nitrile, but depend little on the concentration of copper (I). They ($D_{CuCl}$) decrease in the order propionitrile (2.5) > acetonitrile (1.6) > acrylonitrile (1.0).

The problem with TBP as an extractant for copper (I) is in copper recovery. Thus, while it is possible to recover CuCl from TBP by shaking with water, the insolubility of CuCl results in a precipitate of solid CuCl being dispersed over the two phases. We are not able to strip CuCl as such from water-immiscible nitriles so we chose to separate the nitrile phase from the acqueous phase and to strip the solvent by fractional distillation with direct steam injection, leaving precipitated CuCl in an aqueous phase.

Extraction of $Cu^+$, $Cu^{2+}$, $Fe^{2+}$, $Fe^{3+}$, $Co^{2+}$, $Zn^{2+}$, $Na^+$ and $H^+$ into Acetonitrile Standard aqueous phases containing 0.5 M HCl and from 2 to 4 M NaCl, and containing 2.0 M NaCl and from 0 to 2.5 M HCl, were chosen as representatives of chloride leach liquors. Table II details the effect of sodium chloride and hydrochloric acid concentration on three properties at equilibrium: the relative volumes of the aqueous and organic phases: the composition of the organic phase: and the distribution of NaCl and HCl between the aqueous and organic phases. Data are for mixing equal volumes of acetonitrile and the acidic brine solutions.

TABLE II

Effect of (NaCl) and (HCl) on Phase Volumes and Composition and Extraction of NaCl and HCl from Aqueous into Azeotropic Acetonitrile at 25° i. HCl = 0.5 M

| Aqueous Composition | Phase Volume[c] | | | Organic Composition[a] | | | |
|---|---|---|---|---|---|---|---|
| (NaCl)[b] M | Aq % | Org % | (CH$_3$CN) % w/w | (NaCl) M | $D_{Na}{}^+$ | (HCl) M | $D_{HCl}$ |
| 1.0 | homogeneous | | | | | | |
| 2.0 | 124 | 76 | 86 | 0.025 | 0.015 | 0.042 | 0.067 |
| 2.5 | 120 | 80 | 88 | 0.020 | 0.010 | 0.035 | 0.055 |
| 3.0 | 118 | 82 | 89.5 | 0.017 | 0.007 | 0.031 | 0.048 |
| 3.5 | 116 | 84 | 90.8 | 0.016 | 0.005 | 0.028 | 0.044 |
| 4.0 | 115 | 85 | 91.9 | 0.015 | 0.004 | 0.025 | 0.040 |
| 4.5 | 113 | 87 | 92.6 | 0.014 | 0.003 | 0.024 | 0.038 | ii. NaCl = 2.0 M

| Aqueous Composition | Phase Volume | | | Organic Composition | | |
|---|---|---|---|---|---|---|
| (HCl)[b] M | Aq % | Org % | (HCl) M | $D_{HCl}$ | (NaCl) | $D_{Na}{}^+$ |
| 0.5 | 125 | 75 | 0.040 | 0.10 | 0.021 | 0.015 |
| 1.0 | 130 | 70 | 0.072 | 0.10 | 0.020 | 0.015 |
| 1.5 | 135 | 65 | 0.108 | 0.11 | 0.020 | 0.016 |
| 2.0 | 140 | 60 | 0.143 | 0.10 | 0.021 | 0.017 |
| 2.5 | 145 | 55 | 0.180 | 0.11 | 0.022 | 0.017 |

[a]After mixing and equilibration.
[b]Nominal concentrations in original aqueous phase before mixing.
[c]Relative to original (equal) volumes of organic and aqueous phases prior to mixing.

An increase in the concentration of sodium chloride in the presence of 0.5 M HCl renders acetonitrile less soluble in the aqueous phase. The composition of the organic layer approximates to that of the acetonitrile-water azeotrope (ca. 85% w/w CH$_3$CN) and becomes richer in acetonitrile as the salt concentration increases. At the same time, the composition of the aqueous layer is ca. 15% w/w CH$_3$CN. In contrast with the effect of sodium chloride, an increase in the concentration of hydrochloric acid in the presence of 2 M NaCl enchances the solubility of acetonitrile in the aqueous phase, presumably because HCl is a weaker electrolyte in water and thus more compatible with organic solvents than is NaCl. The distribution coefficients of HCl and NaCl between the azeotropic acetonitrile and the aqueous phases are about 0.1 to 0.01 respectively. Increasing the sodium chloride concentration lowers the distribution coefficient of HCl, whereas increasing the hydrochloric acid concentration does not affect the distribution coefficient of NaCl.

A more detailed study with copper (I) chloride was then carried out to determine whether it is extracted into azeotropic acetonitrile as molecular CuCl or as ion-pair containing the complex $CuCl_2{}^-$ anion. We also wanted to establish the optimum conditions for extraction. Table III summarises the results of this investigation. Although copper (I) chloride is present in the aqueous phase in the form of anions $CuCl_2{}^-$, $CuCl_3{}^{2-}$ etc., it is apparent from the analyses of the organic phase that copper (I) chloride is mainly present as a monochloride. After correcting for the chloride present as NaCl and HCl, the ratio of $Cl^-$ to $Cu^+$ in the acetonitrile phase increases from 1.08 to only 1.17 as more NaCl is added to the aqueous phase (Table III (a)). However, in hydrochloric acid solutions (Table V (b)) this ratio increases from 1.1 to 1.5 with increasing concentration of HCl, indicating that the ion-air $H^+CuCl_2{}^-$ present in the aqueous phase is also extracted into the organic phase. Significantly, the distribution coefficient for copper (I) increases slightly as the aqueous sodium chloride concentration is increased, but decreases as the aqueous hydrochloric acid concentration is increased. The order of extractability of copper (I) chlorides into azeotropic acetonitrile is therefore $CuCl \gg H^+CuCl_2{}^- > Na^+CuCl_2{}^-$. The optimum composition of the aqueous phase is 2 to 4 M NaCl/0.5 M HCl, from which ca. 65% of the CuCl may be extracted in a single contact at unit initial phase ratio.

TABLE III

Distribution of Copper (I) Chloride between Azeotropic Acetonitrile and Aqueous Chloride Solutions Containing NaCl and HCl a. Effect of NaCl (HCl = 0.5 M; CuCl = 0.4 M)

| Initial aqueous[a] | Aqueous[b] | | Organic[b] | | | |
|---|---|---|---|---|---|---|
| (NaCl) | (Cl$^-$) | (Cu$^+$) | (Cl$^-$) | Cl/Cu | Cl/Cu[c] | Extn Cu$^+$ |

TABLE III-continued

Distribution of Copper (I) Chloride between Azeotropic Acetonitrile and Aqueous Chloride Solutions Containing NaCl and HCl

| M | M | M | M total | CuCl | % | $D_{Cu^+}$ |
|---|---|---|---|---|---|---|
| 2.0 | 1.98 | 0.282 | 0.372 | 1.32 | 1.08 | 52.5 | 1.88 |
| 2.5 | 2.46 | 0.300 | 0.391 | 1.30 | 1.11 | 59.4 | 2.26 |
| 3.0 | 2.93 | 0.311 | 0.396 | 1.27 | 1.12 | 63.1 | 2.56 |
| 3.5 | 3.41 | 0.315 | 0.403 | 1.28 | 1.14 | 65.5 | 2.65 |
| 4.0 | 3.88 | 0.313 | 0.401 | 1.28 | 1.16 | 65.9 | 2.70 |
| 4.5 | 4.39 | 0.303 | 0.390 | 1.29 | 1.17 | 65.2 | 2.53 | b. Effect of HCl (NaCl = 2.0 M; CuCl = 0.4 M)

| Initial aqueous[a] (HCl) M | Aqueous | | Organic[b] | | | Extn Cu+ % | $D_{Cu^+}$ |
|---|---|---|---|---|---|---|---|
| | $(Cl^-)$ M | $(Cu^+)$ M | $(Cl^-)$ M | Cl/Cu total | Cl/Cu CuCl | | |
| 0.5 | 1.98 | 0.282 | 0.365 | 1.29 | 1.07 | 52.0 | 1.87 |
| 1.0 | 2.27 | 0.280 | 0.420 | 1.50 | 1.17 | 48.5 | 1.78 |
| 1.5 | 2.54 | 0.265 | 0.460 | 1.74 | 1.26 | 42.5 | 1.57 |
| 2.0 | 2.80 | 0.260 | 0.512 | 1.97 | 1.34 | 38.5 | 1.48 |
| 2.5 | 2.98 | 0.237 | 0.552 | 2.33 | 1.47 | 32.5 | 1.28 |

[a]In aqueous phase prior to mixing equal volumes with acetonitrile.
[b]After mixing and equilibration at 25°. Volumes of respective phases are as given in table 3.
[c]After correcting for Cl− present as NaCl and HCl (TABLE II).

Although the distribution coefficient for the extraction of CuCl from chloride solutions is not high, successive extractions with acetonitrile from a solution of 3 M FeCl$_2$, 1 M NaCl, 0.5 M HCl and 0.4 M CuCl enabled 99% of the copper to be extracted in three contacts each at unit initial phase ratio (Table IV).

TABLE IV

Three-stage Extraction of Copper (I) Chloride from FeCl$_2$ Solution[a] into Azeotropic Acetonitrile

| Stage No. | Equilibrium Volume[b] | | Aqueous | Organic | |
|---|---|---|---|---|---|
| | Aq % | Org % | $(Cu^+)$ M | $(Cu^+)$ M | CuCl extr.[c] % |
| 1 | 126 | 74 | 0.141 | 0.300 | 56 |
| 2 | 118 | 108 | 0.048 | 0.112 | 86 |
| 3 | 110 | 198 | 0.0027 | 0.050 | 99 |

[a]Initial composition 3.0 M FeCl$_2$ - 1.0 M NaCl - 0.5 M HCl - 0.4 M CuCl.
[b]Relative to initial equal volumes of chloride solution and acetonitrile.
[c]Relative to Cu+ remaining in aqueous phase. Extractions were performed under N$_2$ to prevent oxidation of CuCl to CuCl$_2$.

The equilibrium isotherm shown in FIG. 2 indicates that 90% of the copper can be extracted in a four-stage counter-current contact, employing an overall unit phase ratio. If the leach solution contained 0.5 M CuCl the organic phase would be loaded to ca. 0.45 M CuCl.

A comparison of the extraction FeCl$_2$, FeCl$_3$, CuCl, CuCl$_2$, ZnCl$_2$, CoCl$_2$ and NiCl$_2$ into azeotropic acetonitrile is presented in Table V. Nickel and zinc are common impurities in copper sulphide ores and are likely to accumulate in the leach liquors. Distribution coefficients range from $4.10^{-4}$ for NiCl$_2$ to 55 for FeCl$_3$ and differ in solutions containing 3.5 M NaCl and in solutions containing 3.5 M CaCl$_2$ because the chloride ion concentration affects complex ion formation.

TABLE V

Extraction of Metals from Aqueous Chloride Solutions into Azeotropic Acetonitrile at 25° a. Initial aqueous phase 0.5 M HCl, 3.5 M NaCl, 0.5 M metal chloride.

| Metal chloride | FeCl$_2$ | FeCl$_3$ | CuCl | CuCl$_2$ | ZnCl$_2$ | CoCl$_2$ | NiCl$_2$ |
|---|---|---|---|---|---|---|---|
| Distribution coefficient | 0.002 | 2.0 | 2.65 | 0.05 | 0.52 | 0.012 | 0.0008 | b. Initial aqueous phase 0.5 M HCl, 3.5 M CaCl$_2$, 0.5 M metal chloride

| Metal chloride | FeCl$_2$ | FeCl$_3$ | CuCl | CuCl$_2$ | ZnCl$_2$ | CoCl$_2$ | NiCl$_2$ |
|---|---|---|---|---|---|---|---|
| Distribution coefficient | 0.003 | 55 | 1.56 | 0.12 | 0.23 | 0.11 | 0.0004 |

The mode of extraction of copper (I) chloride differs from that of the other metal chlorides listed in table V in that the contribution by ion-pair species (eg H$^+$CuCl$_2^-$) is minimal, whereas for the remaining metals extraction occurs predominantly by ion-pair formation. Thus, for example, cobalt (II) was observed to extracted as the blue-coloured, tetrahedral CoCl$_4^{2-}$, and copper (II) as the corresponding yellow CuCl$_4^{2-}$ species. The role of acetonitrile in ion-pair extraction parallels that of other solvating extractants such as ethers and ketones.

The Equilibrium CuCl$_2$+FeCl$_2$⇌CuCl+FeCl$_3$ in the Acetonitrile Azeotrope

Although neither copper (II) chloride nor iron (II) chloride are extracted individually into the acetonitrile azeotrope to any significant extent, appreciable amounts of both copper and iron are extracted from mixtures of CuCl$_2$ and FeCl$_2$ in aqueous chloride solutions (Table VI). This is due to the equilibrium (equation 2) which produces copper (I) and iron (III) chlorides. In the presence of a large excess of iron (II) chloride and in the absence of iron (III) chloride, all of the copper initially present as copper (II) chloride, is extracted into the azeotropic acetonitrile, together with an equivalent amount of iron. The ratio Fe/Cu in the organic phase is about 1.15. Copper is extracted as copper (I) chloride and iron as iron (III) chlorides, as shown by the chloride to metal ratio in the organic phase. Assuming copper to be present as Cu(CH$_3$CN)$_3$Cl (Table 2) this leaves a ratio of Cl/Fe of about 4, which is consistent with the presence of a Na$^+$FeCl$_4^-$ complex in the acetonitrile phase.

TABLE VI

Extraction of Iron and Copper into Azeotropic Acetonitrile from Aqueous Mixtures of CuCl$_2$ and FeCl$_2$. The Equilibrium
$$CuCl_2 + FeCl_2 \rightleftharpoons CuCl + FeCl_3$$

| Initial Aqueous[a] | | | | Equilibrium Organic[b] | | | | |
|---|---|---|---|---|---|---|---|---|
| FeCl$_2$ M | NaCl M | HCl M | CuCl$_2$ M | (Cu) M | (Fe) M | (Cl$^-$) M | Fe/Cu[c] (CuCl) | Cl/Fe[d] |
| 1.0 | 3.0 | 0.10 | 0.10 | 0.098 | 0.107 | 0.605 | 1.10 | 4.2 |
| 2.0 | 2.0 | 0.10 | 0.10 | 0.100 | 0.114 | 0.712 | 1.14 | 4.7 |
| 3.0 | 1.0 | 0.10 | 0.10 | 0.109 | 0.131 | 0.795 | 1.20 | 4.1 |
| 3.0 | 1.0 | 0.10 | 0.05 | 0.043 | 0.057 | 0.390 | 1.30 | 4.5 |
| 3.0 | 1.0 | 0.10 | 0.20 | 0.214 | 0.244 | 1.185 | 1.14 | 3.5 |

[a]Prior to mixing equal volumes of aqueous phase and acetonitrile.
[b]After mixing. Volumes of respective phases as in Table 2.
[c]Ratio in organic phase without correction for CuCl$_2$ or FeCl$_2$ values in Table 5.
[d]After correcting for Cl$^-$ as NaCl, HCl and as CuCl.

Figure 3:
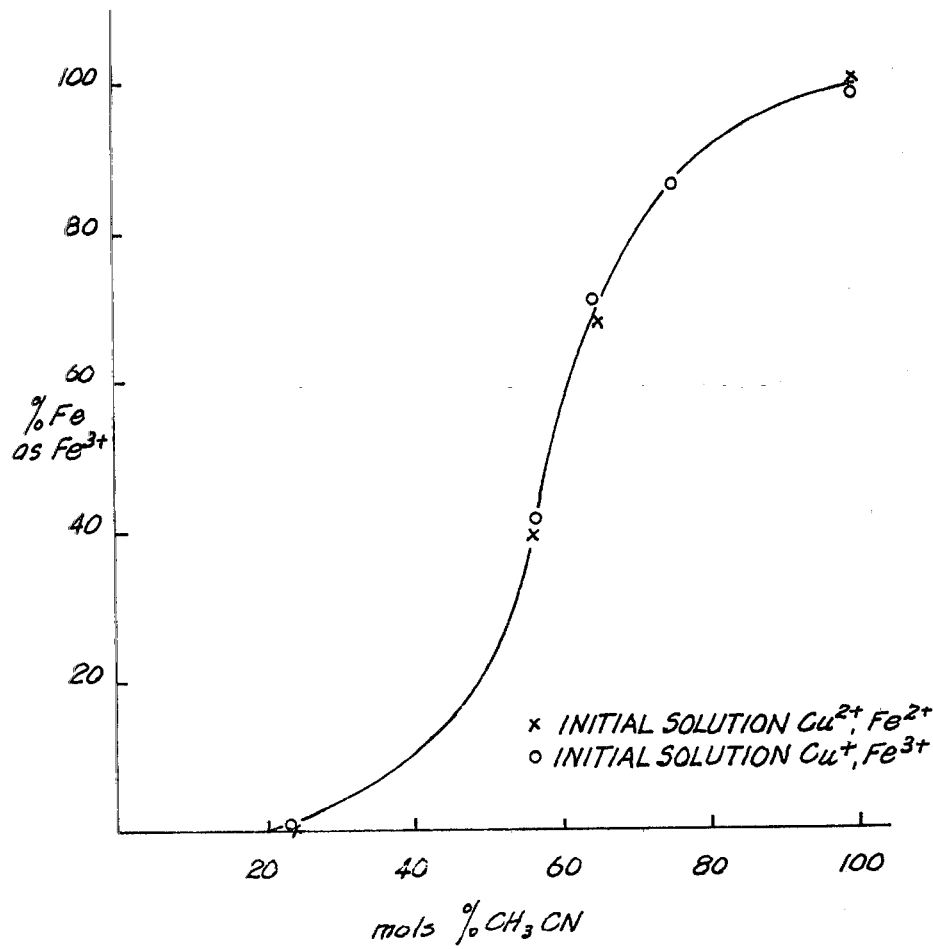
FIG. 3 depicts the effect of acetonitrile on the position of equilibrium for the reaction

Further evidence on the effect of acetonitrile on the equilibrium $Cu^{2+} + Fe^{2+} \rightleftharpoons Cu^+ + Fe^{3+}$ was obtained by UV/visible spectroscopic study of mixtures of CuCl, CuCl$_2$, FeCl$_2$ and FeCl$_3$ in various compositions of acetonitrile-water. In aqueous acetonitrile, solutions of FeCl$_3$ show characteristic absorptions at $\lambda_{max} = 312$ and 355 nm, whilst FeCl$_2$, CuCl and CuCl$_2$ show no appreciable absorption in this region. Mixing dilute solutions of CuCl$_2$ with FeCl$_2$, or mixing CuCl with FeCl$_3$ in water alone gave solutions containing no FeCl$_3$, ie. the equilibrium is to the left. However, as acetonitrile was added, absorption at 312 and 355 nm developed. It azeotropic acetonitrile and spectrum of equimolar solutions of copper (II) chloride and iron (II) chloride after mixing is identical to the spectrum of equimolar solutions of CuCl and FeCl$_3$ after mixing, and the absorption at 312 and 355 nm is the same as for FeCl$_3$ alone. Thus the equilibrium $Cu^{2+} + Fe^{2+} \rightleftharpoons Cu^+ + Fe^{3+}$ is shifted strongly to the right by the addition of acetonitrile. The effect of acetonitrile on the proportion of iron (III) in an iron-copper-chloride system is illustrated in FIG. 3. The equilibrium was approached from both sides using 0.1 M solutions of copper and iron chlorides. The equilibrium constant is 1 in ca 57 mole % CH$_3$CN (75% w/w) at 25°.

In practical terms, this means that during solvent extraction, leach solutions which contain CuCl$_2$ as well as CuCl in the presence of FeCl$_2$ will allow iron to be extracted into the acetonitrile phase. When the acetonitrile is removed by distillation, the equilibrium (equation 2) shifts to the left, so that in pure water equimolar concentration of Cu$^{2+}$ and Fe$^{2+}$ report to the remaining aqueous phase. This results in low yields of CuCl, so it is important to optimise the concentration of CuCl relative to that of CuCl$_2$ in the leach solution, prior to nitrile solvent extraction. This is achieved as reported in the following section. The method is, of course, applicable to other processes which rely on production of CuCl rather than CuCl$_2$.

Optimisation of an Iron (III) Chloride Leach of Chalcopyrite to Produce CuCl.

The leaching of chalcopyrite with the stoichiometric amount of iron (III) chloride (equation 5) consists of two steps. In the first step, FeCl$_3$ oxidises the chalcopyrite and the liberated Cu$^+$ ions to Cu$^{2+}$ (equation 3); in the second step CuCl$_2$ becomes oxidant and leaches the remaining chalcopyrite (equation 4).

| | | | | | |
|---|---|---|---|---|---|
| Step 1 | $0.74 CuFeS_2 + 3Fe^{3+}$ | $\rightarrow 0.75Cu^{2+}$ | $+ 3.75Fe^{2+}$ | $+ 1.5S$ | ...3 |
| Step 2 | $0.25 CuFeS_2 + 0.75Cu^{2+}$ | $\rightarrow Cu^+$ | $+ 0.25Fe^{2+}$ | $+ 0.5S$ | ...4 |
| Overall | $CuFeS_2 + 3Fe^{3+}$ | $\rightarrow Cu^+$ | $+ 4Fe^{2+}$ | $+ 2S$ | ...5 |

Because FeCl$_3$ is a stronger oxidant than CuCl$_2$ in brine solutions, step 2 (equation 4) does not extract copper as efficiently as step 1 (equation 3). In order to maximise the concentration of Cu$^+$ in the leach liquor it is preferable to leach in two stages. In the first stage Cu$^{2+}$ is reduced with fresh chalcopyrite. In the second stage the chalcopyrite partially leached by CuCl$_2$ is then completely leached be FeCl$_3$. Details of a two-stage counter-current leach of chalcopyrite performed in this manner are given below. Effectively, equation 3 above becomes step 2, with part-leached rather than fresh chalcopyrite, the equation 4 becomes step 1, with fresh rather than part-leached chalcopyrite.

Leaching and Extraction of CuCl

A two-stage counter current leach offers several advantages for the present process. Thus FeCl$_3$ oxidation of partially, leached chalcopyrite gave a solution of FeCl$_2$ containing copper (II) chloride. This solution readily leached about 25% of the copper from a fresh batch of chalcopyrite and thereby effected the reduction of the copper (II) chloride to copper (I) chloride, requiring less than 10 minutes at reflux temperature (FIG. 4). After solid-liquid separation, ca 90% of the copper in the leach solution was present as copper (I) chloride. The residue, analysing 24.4% Cu, was largely unaltered chalcopyrite. Further leaching of this residue with FeCl$_3$ at reflux (ca 107°) extracted > 98% of the copper in 5 to 7 hours. The final residue consisted mainly of pyrite, silica, and elemental sulphur. Details of the compositions of solutions and residues are in Table V11.

TABLE VII

Leach-Solvent Extraction and Recovery of Copper (I) Chloride from Chalcopyrite Concentrate using Iron (III) and Copper (II) Chlorides as Oxidants

| | Leach Solution[a] | | | | | Solid[b] | | | Total |
|---|---|---|---|---|---|---|---|---|---|
| | $Cu^{2+}$ M | $Cu^{+}$ M | $Fe^{2+}$ M | $Fe^{3+}$ M | $CH_3CN$ g | wt g | Cu % | Fe % | Cu g |
| I. Leach | | | | | | | | | |
| Stage 1 initial | 0.52 | — | 2.93 | — | | 184 | 25.3 | 26.4 | 46.5 |
| final | 0.07 | 0.57 | 2.92 | — | | 146 | 24.4 | 27.1 | 36.6 |
| Stage 2 initial | — | — | — | 2.25 | | 146 | 24.4 | 27.1 | 36.6 |
| final | 0.52 | — | 2.93 | — | | 77[f] | 1.0 | 11.0 | 0.8 |
| II. Reduction with Copper | | | | | | | | | |
| initial | 0.07 | 0.57 | 2.92 | — | | 8.8 | 95 | — | 8.4 |
| final | <0.02 | 0.68 | 2.92 | — | | 4.2 | 95 | — | 4.0 |
| III. Solvent Extraction with $CH_3CN$[b] | | | | | | | | | |
| initial | <0.02 | 0.68 | 2.92 | — | — | — | — | — | 44[b] |
| raffinate[c] | 0.09 | <0.01 | 2.9 | — | 230 | — | — | — | 5.5[b] |
| organic[d] | <0.01 | ~0.6 | <0.01 | ~0.08 | 550 | — | — | — | — |
| aqueous liquor[d] | 0.24 | 0.11 | 0.27 | — | 2 | | | | 6.6 |
| IV. Copper (I) Chloride recovery | | | | | | 50 | 64 | 0.0015 | 32 |
| V. Cementation of Aqueous Liquor with Iron | | | | | | | | | |
| initial | 0.24 | 0.11 | 0.27 | — | 2 | 8.0 | — | 99 | — |
| final | <0.01 | <0.01 | 0.55 | — | 2 | 8.0 | 85 | 15 | 6.6 |

[a] Also contained 1.0 M NaCl and 0.5 M HCl
[b] In 1 liter of solution.
[c] After distillation of $CH_3CN$ and readjustment to original volume.
[d] ~90% w/w $CH_3CN$ upper layer after four stage counter current extraction. Concentrations approximate.
[e] After addition of 300 ml water at pH 1.5 and distillation of $CH_3CN$. Volume = 300 ml.
[f] Also contained 45 g sulphur extractable by $CS_2$. Of original sulphur 77% recovered as S, 16% as $FeS_2$, 3% as $SO_4^{2-}$.

Following this two-stage leach of chalcopyrite, the pregnant liquor was treated with cement to convert the remaining 10% copper (II) to copper (I). The copper (I) chloride complex was then extracted in a four-stage counter-current manner with acetonitrile at unit overall phase ratio. Some phase volume changes were noted in the first stage, because acetonitrile is partly soluble in the aqueous phase. However, subsequent extractions maintained nearly constant volumes of each phase, as the aqueous solution became saturated with acetonitrile. All extractions were performed under nitrogen in order to minimise the oxidation of $Cu^+$ to $Cu^{2+}$ by air. We believe that perforated plate columns, rather than mixer-settlers, would be preferable on a large scale because of the oxidation problem. During the solvent extraction process, crystals of $CaSO_4.2H_2O$ precipitated from the raffinate phase. Presumably the leach solution was saturated with calcium sulphate and, being less soluble in the presence of nitriles, this is precipitated when acetonitrile is mixed with the aqueous solution. Distillation of the raffinate to recover azeotropic acetonitrile allowed the solid to redissolve into the aqeuous phase. This now wholly aqueous raffinate, containing 2.92 M $Fe^{2+}$ and 0.09 M $Cu^{2+}$ (12% of the original copper), was suitable for regeneration of the $FeCl_3$ leachant and precipitation of excess iron as $Fe_2O_3$ by oxydrolysis with $O_2$ at 80° (Haver et al., 1975 U.S. Bureau of Mines R.I. 8007) or by oxidation with chlorine (Haver and Wong, 1971 Journal of Metals 23; 25–24). No attempt was made in this work to regenerate the leachant.

The organic phase of azeotropic acetonitrile has extracted 88% of the copper, together with some iron. As noted previously, the remaining 12% copper has been oxidised to $Cu^{2+}$ and so remained with $FeCl_2$ in the raffinate. In the absence of oxidation, as would be the case on a larger scale of operation, more copper and less iron would be extracted. Distillation of the organic phase acetonitrile recovered 96–99% of the acetonitrile as its azeotrope. Pure CuCl precipitated in the aqueous bottoms. The iron present in the organic phase remained in solution in the acidified bottoms, as did 14% of the total copper, which was present mainly as $Cu^{2+}$ due to unavoidable oxidation (table V11). This soluble copper was recovered by cementation onto iron after removal of the precipitated CuCl. Analysis of the CuCl product showed the impurity levels to be (ppm) Fe, 16; Zn, 5; Pb, 5; Ni, 4; Co, 2; As, 0.2; Bi, 10 and Ag, 20. Milner et al (1973) have shown that CuCl may be reduced to copper powder by hydrogen or carbon.

Overall Process and Conclusion

An overall process for the oxidative leaching of chalcopyrite, partly with iron (III) chloride and partly with copper (II) chloride, followed by solvent extraction and recovery of copper (I) chloride with acetonitrile, is shown in FIG. 5. A materials balance of one of several laboratory experiments is shown in Table V11. On the small laboratory scale used, solution of copper (I) were subject to oxidation to copper (II) which led to an overall decrease in the efficiency of the process. Mixtures of copper (II) and iron (II) in the presence of chloride ion or acetonitrile then established an equilibrium $Cu^{2+} + Fe^{2+} \rightleftharpoons Cu^+ + Fe^{3+}$ which lies to the right and allows both copper and iron to be extracted into azeotropic acetonitrile as CuCl and $Na^+FeCl_4^-$.

The two-stage leach has advantages in that copper (I) rather than copper (II) chloride is produced for subsequent reduction to copper. Electrolysis is slow and consumes high-grade energy. Distillation of acetonitrile is fast and is easier than the distillation of water ($\Delta H_{vap} \approx 700$ kJ/kg). Whilst more energy may be required overall compared to electrolysis, this energy may be of low grade (eg. waste stream, solar), requiring low capital costs. Crystallisation of CuCl from solutions of high chloride ion activity by cooling gives poor yields whilst the precipitation of the butadiene-CuCl adduct proceeds slowly unless combined with refrigeration of the solutions.

We claim:

1. A method of obtaining purified copper (I) chloride from chalcopyrite comprising:
   (a) leaching said chalcopyrite with an aqueous solution containing ferric and chloride ions, and reducing cupric ions resulting from the chalcopyrite to cuprous ions, to result in an aqueous solution containing copper (I) chloride;
   (b) solvent extracting the copper (I) chloride into an azeotropic solution of acetonitrile and water, and separating the solution from the raffinate which results from the extraction;
   (c) separating insoluble material from the solution;
   (d) evaporating the solution to recover acetonitrile, with said evaporation resulting in an aqueous liquid and precipitate of copper (I) chloride; and
   (e) separating the precipitate of copper (I) chloride from the aqueous liquid.

2. A method according to claim 1, wherein step (d) is carried out by distillation, and wherein the acetonitrile resulting from step (d) is recycled to step (b) for its use in solvent extracting.

3. A method of purifying copper (I) chloride comprising:
   (a) solution leaching copper chloride from a copper containing ore, reducing the copper (II) chloride in the leach solution to copper (I) chloride;
   (b) solvent extracting the leach solution with an azeotropic solution acetonitrile and water to provide an extract containing copper (I) chloride dissolved therein;
   (c) separating insoluble material from the solution;
   (d) evaporating the solution to recover acetonitrile, with said evaporation resulting in an aqueous liquid and precipitate of copper (I) chloride; and
   (e) separating the precipitate of copper (I) chloride from the aqueous liquid.

4. A method according to claim 3, wherein step (d) is carried out by distillation, and wherein the acetonitrile resulting from step (d) is recycled to step (b) for use in solvent extracting.